(12) United States Patent
Strauch et al.

(10) Patent No.: US 10,005,621 B2
(45) Date of Patent: Jun. 26, 2018

(54) UNLOADING DEVICE FEATURING VACUUM SUCTION

(71) Applicant: GEA Lyophil GMBH, Hürth (DE)

(72) Inventors: Harald Strauch, Bedburg (DE); Johannes Selch, Hürth (DE); Daniel Steinkellner, Hürth (DE); Rolf Kirfel, Kall (DE)

(73) Assignee: GEA LYOPHIL GmbH, Hurth (DE)

( * ) Notice: Subject to any disclaimer, the term of this patent is extended or adjusted under 35 U.S.C. 154(b) by 0 days. days.

(21) Appl. No.: 15/100,963

(22) PCT Filed: Dec. 3, 2014

(86) PCT No.: PCT/EP2014/076456
§ 371 (c)(1),
(2) Date: Jun. 1, 2016

(87) PCT Pub. No.: WO2015/082563
PCT Pub. Date: Jun. 11, 2015

(65) Prior Publication Data
US 2016/0304291 A1    Oct. 20, 2016

(30) Foreign Application Priority Data
Dec. 5, 2013   (DE) .......................... 10 2013 225 047

(51) Int. Cl.
| | |
|---|---|
| *B65G 47/52* | (2006.01) |
| *B65G 47/53* | (2006.01) |
| *B65G 47/66* | (2006.01) |
| *B65G 45/00* | (2006.01) |
| *B65G 47/08* | (2006.01) |
| *F26B 5/06* | (2006.01) |
| *F26B 25/00* | (2006.01) |

(52) U.S. Cl.
CPC ........... *B65G 45/00* (2013.01); *B65G 47/082* (2013.01); *B65G 47/53* (2013.01); *B65G 47/66* (2013.01); *F26B 5/06* (2013.01); *F26B 25/001* (2013.01); *F26B 25/003* (2013.01)

(58) Field of Classification Search
CPC ...... B65G 47/52; B65G 47/525; B65G 47/53; B65G 47/66
USPC .......................... 198/438, 457.01, 539, 689.1
See application file for complete search history.

(56) References Cited

U.S. PATENT DOCUMENTS

| | | | |
|---|---|---|---|
| 4,304,508 A | 12/1981 | Wolf | |
| 4,986,407 A * | 1/1991 | Heuft | ................... B65G 47/766 |
| | | | 198/367 |
| 5,887,699 A * | 3/1999 | Tharpe | ................... B07C 3/065 |
| | | | 198/367 |
| 6,202,828 B1 * | 3/2001 | Roskam | ................. B65H 29/32 |
| | | | 198/457.03 |

(Continued)

FOREIGN PATENT DOCUMENTS

| | | |
|---|---|---|
| DE | 33 37 405 A1 | 4/1985 |
| DE | 10 2008 020 705 A1 | 10/2009 |

(Continued)

*Primary Examiner* — Douglas A Hess
(74) *Attorney, Agent, or Firm* — Craig Metcalf; Kirton McConkie

(57) ABSTRACT

An unloading device (10) for a product handling device, having a transfer plate (12) for transferring a plurality of rows arranged one after the other, each row having a plurality of treated products (14), onto a conveying apparatus (16) is characterized in that a suctioning section (18) having suction ports (20) for suctioning the products onto the suctioning section (18) is arranged between the transfer plate (12) and the conveying apparatus (16).

5 Claims, 3 Drawing Sheets

(56) References Cited

U.S. PATENT DOCUMENTS

Figure 1:
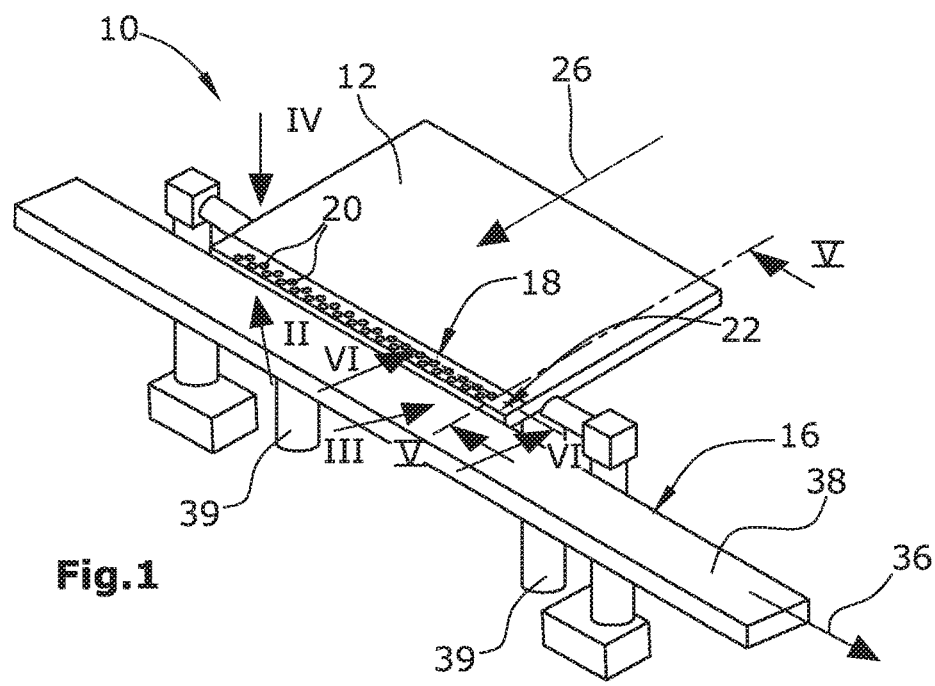

| | | | | |
|---|---|---|---|---|
| 6,289,579 | B1* | 9/2001 | Viza | B65G 47/26 |
| | | | | 29/739 |
| 6,446,789 | B1* | 9/2002 | Goodman | B65G 21/2027 |
| | | | | 198/457.01 |
| 6,609,610 | B2* | 8/2003 | Guidetti | B65G 21/2036 |
| | | | | 198/457.03 |
| 6,711,880 | B2* | 3/2004 | Wipf | B65B 9/06 |
| | | | | 53/203 |
| 7,070,384 | B2* | 7/2006 | Keyes | B65G 57/26 |
| | | | | 198/374 |
| 7,347,312 | B2* | 3/2008 | Han | B65G 49/064 |
| | | | | 198/346.2 |
| 7,597,528 | B2* | 10/2009 | Rodi | B65G 47/82 |
| | | | | 198/419.1 |
| 7,954,810 | B2* | 6/2011 | Van Den Aker | B29C 70/202 |
| | | | | 271/184 |
| 8,011,493 | B2* | 9/2011 | Giuliani | B65G 47/244 |
| | | | | 198/406 |
| 8,459,183 | B2* | 6/2013 | Weingartner | B41J 3/407 |
| | | | | 101/35 |
| 8,714,339 | B2* | 5/2014 | Brun | B65H 29/16 |
| | | | | 198/370.07 |
| 9,187,255 | B2* | 11/2015 | Oullette | B65G 21/2036 |
| 2006/0070927 | A1 | 4/2006 | Henry | |
| 2012/0217136 | A1 | 8/2012 | Ouellette et al. | |

FOREIGN PATENT DOCUMENTS

| | | |
|---|---|---|
| EP | 0 237 149 A2 | 9/1987 |
| EP | 2 112 447 A2 | 10/2009 |

* cited by examiner

UNLOADING DEVICE FEATURING VACUUM SUCTION

This application is a National Stage of International Application No. PCT/EP2014/076456, filed Dec. 3, 2014, and entitled UNLOADING DEVICE FEATURING VACUUM SUCTION, which claims the benefit of DE 10 2013 225 047.9, filed Dec. 5, 2013. This application claims priority to and incorporates herein by reference the above-referenced applications in their entirety.

The invention relates to an unloading device for a product handling device.

A product handling device may be a freeze dryer for freeze drying substances that are arranged in product containers. To this end, a product handling device typically has a treatment chamber in which the products to be treated are arranged on storage surfaces. During the treatment, the products on the storage surface are disposed inside the closed treatment chamber. Following the treatment, the products are supplied to a conveying apparatus via a transfer plate.

The products are moved in a plurality of rows arranged one after the other along a transfer direction via the transfer plate. The products or product containers in adjacent rows are generally offset to one another so that as many product containers/products as possible fit onto the transfer plate. Each product row extends across the total width of the transfer plate.

The conveying apparatus conveys the front-most row of products or product containers along a conveying direction arranged transverse to the transfer direction. The conveying apparatus may be a conveyor belt, for instance.

When the products are transferred from the transfer plate onto the conveying apparatus, there is a difficulty with conveying only the product containers of the front-most product row immediately adjacent to the conveying apparatus. In particular due to the offset arrangement of the products in adjacent rows and because of the friction between adjacent products, frequently products in a next row are carried along, as well. This leads to the products being unordered, that is, in an undefined arrangement, on the conveying apparatus. Allocating a product on the conveying apparatus to its previous position on the transfer plate is then made more difficult by this.

The underlying object of the invention is to improve the transfer of the products from the transfer plate to the conveying apparatus.

In accordance with the invention, provided in the transition area between the transfer plate and the conveying apparatus is a suctioning section having suction ports through which the products are suctioned onto the suctioning section. Suctioning the products onto the suctioning section prevents products from a next row from being carried along onto the conveying apparatus by the front-most, transferred row. The suctioning of the products onto the suctioning section occurs with a force such that it is not possible to push the products across the suctioning section towards the conveying apparatus during the suctioning. When pushing the products across the suctioning section, only the current front-most product row is then carried along by the conveying apparatus and conveyed transverse to the transfer direction.

One essential advantage is not only that only the products from the front-most row move onto the conveying apparatus. Another advantage is that a product row is conveyed completely and in order from the transfer plate onto the conveying apparatus. Because of this, using the position of a product within a transferred product row, the product's prior position on the transfer plate may be maintained. This is particularly important in an automated random sampling type of product quality check.

Another advantage is that the conveying apparatus may be operated at higher conveying speeds without carrying along products from a next row.

The products are suctioned onto the suctioning section from below using the suction ports, that is, the bottoms of the products or product containers are suctioned. No parts are needed above the products. In the field of pharmaceutical freeze drying, this is important for avoiding contamination.

Products may be construed to mean product containers that contain the treated product. In the field of freeze drying, these are product containers, carpules, or similar containers, such as for instance the syringe cylinders that are suitable for freeze drying and that contain the freeze-dried product.

The product rows having adjacently arranged products extend across the entire width of the transfer plate and across the entire width of the suctioning section. The products may be advanced from behind with a pusher against the rear-most product row, for instance, along the transfer plate and the suctioning section.

The suction ports are arranged in at least two rows behind one another in the transfer direction. Each row of suction ports extends transverse to the transfer direction and parallel to the conveying direction. The spacing and diameters of the suction ports are embodied such that at least two suction ports, and preferably at least three suction ports, are allocated to each product or product container. Because of this, therefore, each product that is resting on the suctioning section is suctioned by at least two, and preferably at least one, suction port.

The distance between directly adjacent suction ports may in particular be about 1 mm to 5 mm, while the diameter of the suction ports may be in the range between 3 mm and 8 mm. The sum of twice the diameter of a suction port and the distance between adjacent suction ports should be less than the diameter of the suctioned surface (bottom surface) of the product.

The front-most row of suction ports adjacent to the conveying apparatus should be arranged at a distance of about 5-8 mm and preferably about 6.5 mm from the edge of the conveying apparatus or conveyor belt. The conveying plane of the conveying apparatus may be arranged at the same height as the suctioning section or preferably slightly below the suctioning section. Particularly advantageously, the conveying plane is arranged in a range between 0.1 and 0.25 mm below the suctioning section.

The suctioning section is advantageously the surface of a suctioning device that is embodied as an exchangeable part and that has an inner suction chamber that is in suction communication with each of the suction ports. The suction chamber is provided with at least one vacuum connector for connecting a vacuum pump for evacuating the suction chamber. Advantageously, at least two vacuum connectors are provided.

The suction device is preferably provided with cleaning ports that are arranged on mutually opposing sides of the suction chamber and that may be opened for cleaning the suction chamber. In the field of freeze-drying, and in particular in the field of pharmaceutical freeze-drying, regular cleaning and autoclaving of the parts used is especially important. The cleaning ports are closable. For cleaning or autoclaving, the cleaning ports may be opened in order, for instance, to blow out the suction chamber and the suction ports with compressed air.

In accordance with a refinement of the invention, the transfer plate is provided with a lifting device to move the transfer plate into a cleaning position during the cleaning of the suctioning section and/or suction chamber. In the cleaning position, the transfer plate is preferably disposed above the plane of the suctioning section. The suctioning section and/or the suction chamber may be reached in the cleaning position. The lifting device should advantageously be disposed below the transfer plate to prevent a risk of the lifting device contaminating products on the transfer plate.

The products may be conveyed alternately along the transfer direction on the transfer plate and the suctioning section and along the conveying direction on the conveying apparatus. This means that during the advance along the transfer direction there is no conveying with the conveying apparatus. During the conveying along the conveying direction, then, there is no advance along the transfer direction. The products are suctioned onto the suctioning section continuously, however, that is, both during the conveying along the conveying direction and also during the advancing along the transfer direction.

The suctioning device is advantageously embodied to be exchangeable. That is, the suctioning device, together with the suctioning section, may be removed completely for cleaning or to exchange it for another suctioning device. This also makes it possible to refit an existing unloading device with the inventive suctioning device.

The suctioning section may preferably be exchanged for a suctioning section with different diameters, arrangements, and/or spacing of the suction ports. This is advantageous when products of different sizes are to be moved with the same unloading device.

An exemplary embodiment of the invention shall be explained in greater detail, using the figures, in the following.

Figure 2:
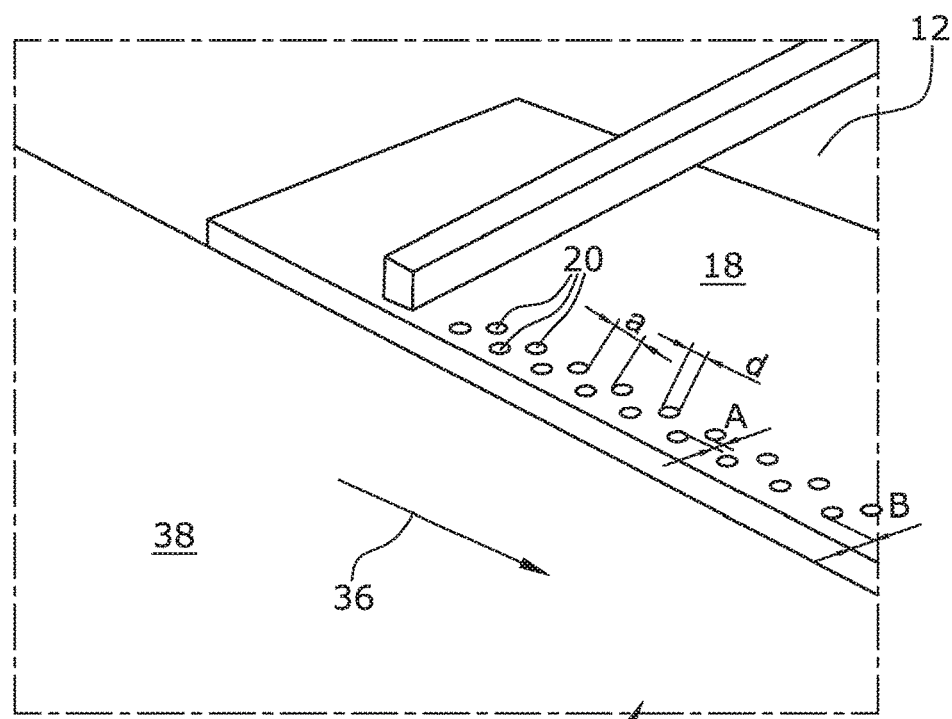
Figure 3:
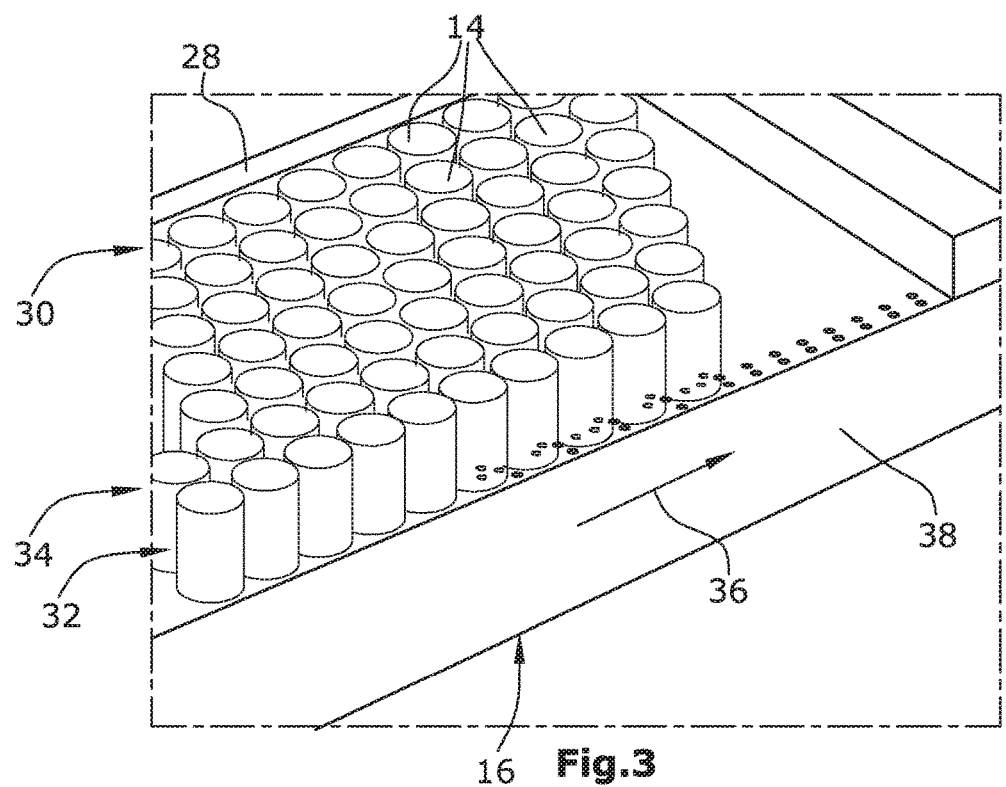
Figure 4:
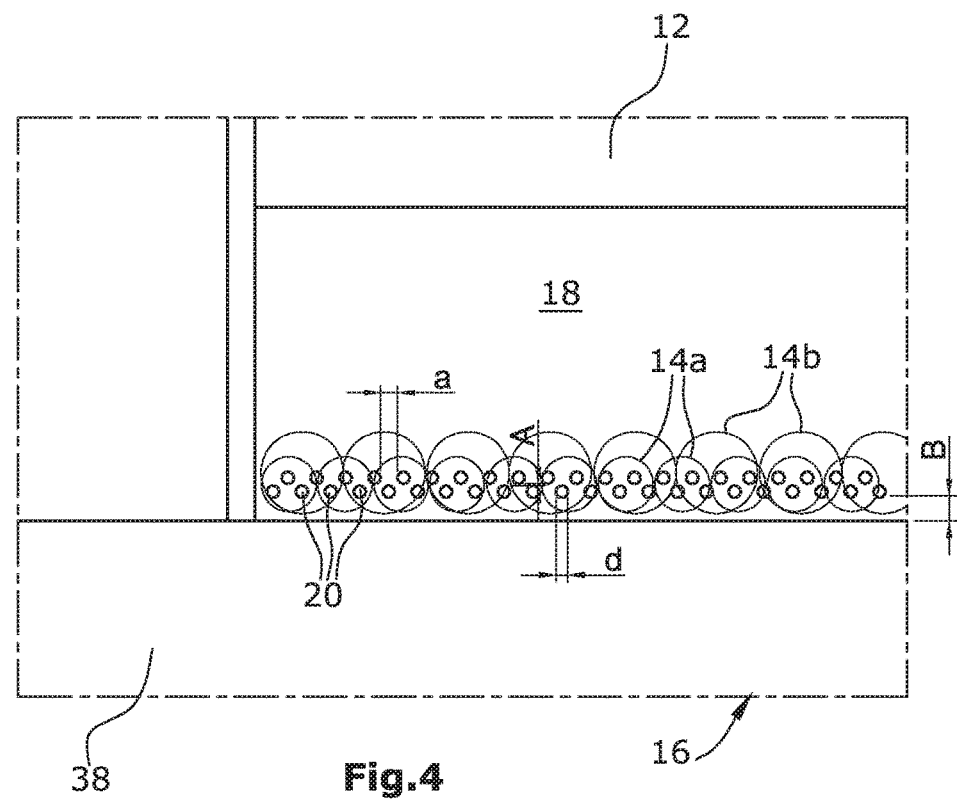
Figure 5:
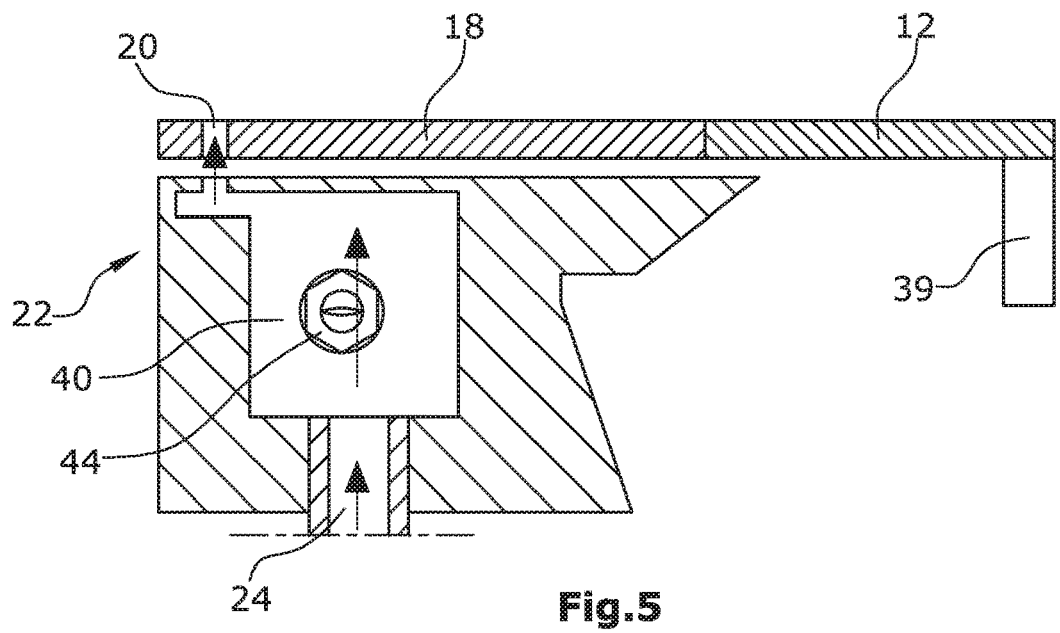
Figure 6:
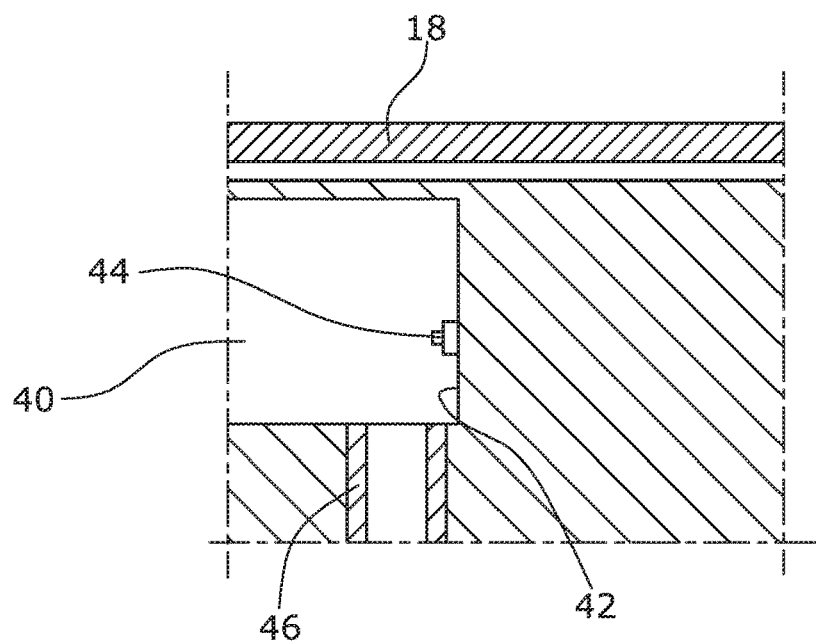

FIG. 1 is a perspective elevation;
FIG. 2 is a detail according to the arrow II in FIG. 1;
FIG. 3 is a detail view from the direction of the arrow III in FIG. 1 in the loaded condition;
FIG. 4 is a schematic view from the direction of the arrow IV in FIG. 1;
FIG. 5 is a section along the line V-V in FIG. 1; and,
FIG. 6 is a section along the line VI-VI in FIG. 1.

The transfer plate 12 of the unloading device 10 is embodied in the conventional manner, such as is described, for instance, in DE 10 2008 020 705 A1. The products depicted in FIG. 3 in the form of product containers are conveyed along the transfer direction 26 in that a pusher 28 pushes against the rear-most product row 30. Because of this, the front-most product row 32 is pushed across the suctioning section 18 onto the conveyor belt 38 of the conveying apparatus 16. The next product row 34, which is arranged immediately behind the front-most row 32, is suctioned onto the suctioning section 18 via the suction ports 20. The bottoms of the product containers/products 14 are suctioned from below. The conveying apparatus 16 conveys the front-most product row 32 along a conveying direction 36 arranged transverse to the transfer direction 26.

The suction ports 20 are arranged on the suctioning section 18 in two successively arranged rows. The rows of the suction ports 20 are arranged parallel to the conveying direction 36 and transverse to the transfer direction 26 and each extend across the entire width of the suctioning section 18 and transfer plate 12. The suction ports 20 of adjacent rows are arranged offset to one another. The diameter d of each suction port 20 is about 3 mm. The distance a between adjacent suction ports 20 in a row is approximately 5 mm.

The distance a extends from the edge of the one suction port to the edge of the adjacent suction port 20. The two rows of suction ports are arranged at a distance A of approximately 1.1 mm from one another. The distance A extends towards the transfer direction 26 between the edges of the suction ports 20. The distance B between the edges of the front-most row of suction ports 20 to the edge of the conveying apparatus 16 is approximately 6.5 mm.

The suctioning section 18, with the suction ports 20, is the surface of a suctioning device 22 in the form of a bar having an inner suction chamber 40 that is connected to the suction ports 20. On the bottom side opposing the suctioning section 18, the suctioning device 22 has vacuum connectors 24 that are connected to a vacuum pump. The vacuum pump then generates a vacuum in the suction chamber 40 in order to suction the products 14 onto the suctioning section 18 using the suction ports 20. The suction chamber 40 with the vacuum connectors 24 is depicted in the step in accordance with FIG. 5. The suctioning device is preferably provided with three vacuum connectors 24 that are arranged distributed at equal intervals across the entire length of the suctioning device 22 in the conveying direction 36. Two vacuum connectors 24 are connected at mutually opposing end-face ends of the suctioning device 22 to the bottom of the suction chamber 40, wherein the third vacuum connector 24 is connected in the center of the suctioning device 22 to the bottom of the suction chamber 40.

For cleaning the suction chamber 40 and the suctioning section 18, cleaning nozzles 44 are provided at the end-face, mutually opposing ends 42 of the suction chamber 40. A cleaning nozzle 44 that is directed into the suction chamber 40 is provided at each end-face end 42. Furthermore, a drain 46 is provided in the bottom surface of the suction chamber 40 in the area of each of the end-face ends 42 of the suction chamber 40. The cleaning medium that has been sprayed by the cleaning nozzles 44 may drain out through the drain 46.

FIG. 4 provides schematic depictions of different size products 14a, 14b. The products 14a have a smaller diameter than the products 14b. While at least three entire suction ports are allocated to each of the three products 14a, the larger products 14b each completely cover at least five suction ports 20. The pusher 28 pushes the rows 30, 32, 34 of the products 14 forward until about two-thirds of the diameter of the products 14 in the front-most product row 32 is resting on the conveyor belt of the conveying apparatus 16. Then there is slight suction across the front-most row of the suction ports 20 in the area of the rear edge of the products 14 in this front-most row 32. The next, second product row 34 is then suctioned more strongly than the front-most row 32, because the next row 34 experiences greater coverage with the suction ports 20, as FIG. 3 illustrates.

The advance along the transfer direction with the pusher 28 is then stopped, while the vacuum suction via the suction ports 20 continues. Then the conveyor belt of the conveying apparatus 16 is set in motion, wherein the front-most row 32 of the products 14 is carried along by the conveying apparatus 16 and is conveyed along the conveying direction 36. Because the second row 34 is now experiencing maximum suction, no product 14 from this row 34 is carried along by the front-most row 32.

As soon as the rear-most product 14 in the row 32 in the conveying direction 36 has been conveyed out of the area of the transfer plate 12 and the suctioning section 18, the conveying apparatus 16 is stopped and the next, now front-most product row is pushed by the pusher 28 onto the conveying apparatus 16 and the process is repeated.

For cleaning the suction chamber 40 and the suctioning section 18, the transfer plate 12 is driven vertically upward about 100 mm by the lifting cylinders of the lifting device 39. This prevents cleaning medium exiting upward through the suction ports 20 during the cleaning process from contaminating products 14 arranged on the transfer plate 12. The advantage may thus be seen in the fact that the cleaning may take place while the products 14 are on the transfer plate 12.

The invention claimed is:

1. A method for conveying treated products with an unloading device, comprising:
   conveying the treated products in a plurality of rows arranged one after the other in a transfer direction along a transfer plate of the unloading device, wherein the products of adjacent rows are arranged offset to one another, the unloading device having the transfer plate for transferring the plurality of rows arranged one after the other onto a conveying apparatus, each row having a plurality of the products, wherein a suctioning section having suction ports for suctioning the products onto the suctioning section is arranged between the transfer plate and the conveying apparatus;
   supplying the products via the suctioning section along the transfer direction, to the conveying apparatus, which conveys the products in a conveying direction transverse to the transfer direction; and
   suctioning with the suction ports the products of at least an entire product row onto the suctioning section of the unloading device.

2. The method of claim 1, characterized in that the suctioning step occurs such that only products in a front-most product row are carried along by the conveying apparatus, while products in a next row are retained on the suctioning section by the suctions ports.

3. The method of claim 2, characterized in that the plurality of rows are advanced along the conveying direction and the front-most product row is conveyed along the conveying direction in an alternating manner, while the vacuum suction through the suction ports is continuous.

4. The method of claim 1, characterized in that the conveying apparatus permits slow and fast conveying speeds of up to 600 products per minute.

5. The method of claim 1, characterized in that, for cleaning the suctioning section and/or a suctioning chamber of the unloading device, the transfer plate is moved into a cleaning position above the suctioning section.

* * * * *